United States Patent
Koga et al.

(10) Patent No.: US 9,062,188 B2
(45) Date of Patent: Jun. 23, 2015

(54) ACRYLIC RUBBER COMPOSITION

(75) Inventors: Atsushi Koga, Kanagawa (JP); Hiroyuki Sano, Kanagawa (JP)

(73) Assignee: NOK Corporation, Tokyo (JP)

( * ) Notice: Subject to any disclaimer, the term of this patent is extended or adjusted under 35 U.S.C. 154(b) by 0 days.

(21) Appl. No.: 13/704,901

(22) PCT Filed: Feb. 15, 2012

(86) PCT No.: PCT/JP2012/053451
§ 371 (c)(1),
(2), (4) Date: Dec. 17, 2012

(87) PCT Pub. No.: WO2012/117849
PCT Pub. Date: Sep. 7, 2012

(65) Prior Publication Data
US 2014/0005339 A1    Jan. 2, 2014

(30) Foreign Application Priority Data
Feb. 28, 2011 (JP) ................. 2011-041101

(51) Int. Cl.
| | |
|---|---|
| C08K 5/205 | (2006.01) |
| C08K 5/18 | (2006.01) |
| C08L 33/04 | (2006.01) |
| C08L 13/00 | (2006.01) |
| C08L 33/02 | (2006.01) |
| C08K 5/34 | (2006.01) |
| C08K 5/3465 | (2006.01) |
| C08K 5/3462 | (2006.01) |
| C08L 33/06 | (2006.01) |

(52) U.S. Cl.
CPC .............. *C08L 13/00* (2013.01); *C08L 33/02* (2013.01); *C08L 33/04* (2013.01); *C08K 5/34* (2013.01); *C08K 5/3465* (2013.01); *C08K 5/18* (2013.01); *C08K 5/205* (2013.01); *C08K 5/3462* (2013.01); *C08L 33/06* (2013.01)

(58) Field of Classification Search
CPC .......... C08K 5/18; C08K 5/34; C08K 5/3462; C08K 5/3465; C08K 5/205; C08L 33/02; C08L 33/06; C08L 33/04; C08L 13/00
USPC ............ 525/329.8, 329.9, 330.4, 330.5, 374, 525/375, 379, 382
See application file for complete search history.

(56) References Cited

FOREIGN PATENT DOCUMENTS

| | | |
|---|---|---|
| EP | 0 943 657 A2 | 9/1999 |
| EP | 2 243 770 A1 | 10/2010 |
| EP | 2243770 A1 * | 10/2010 |
| JP | 2001-175841 | 6/2004 |
| JP | 2009-097018 | 5/2009 |
| JP | 2010-241706 | 10/2010 |
| WO | WO 03/004563 A1 | 1/2003 |
| WO | WO 2008/069218 A1 | 6/2008 |
| WO | WO 2009/096545 A1 | 8/2009 |

OTHER PUBLICATIONS

International Search Report based on PCT application No. PCT/JP2012/053451 dated May 15, 2012 (4 pgs).
International Preliminary Report on Patentability and Written Opinion from corresponding PCT application No. PCT/JP2012/053451 dated Sep. 12, 2013 (6 pgs).

* cited by examiner

*Primary Examiner* — Roberto Rabago
(74) *Attorney, Agent, or Firm* — Brinks Gilson & Lione

(57) ABSTRACT

Disclosed is an acrylic rubber composition comprising, based on 100 parts by weight of carboxyl group-containing acrylic rubber, 0.05 to 5 parts by weight of a diurethane compound represented by the general formula: $R^2(SO_2)_m(CH_2)_nOCONHR^1NHCOO(CH_2)_n(SO_2)_mR^2$ ($R^1$: a divalent organic group; $R^2$: when it is in a carbamate structure form, a group that decomposes by the action of a basic vulcanization accelerator; n: 0, 1, or 2; and m: 0 or 1), 0.3 to 3 parts by weight of a diaminodiphenyl ether-based compound, and 0.08 to 1.2 parts by weight of an N-containing heterocyclic compound; the composition being free from 1,3-o-tolylguanidine. This acrylic rubber composition allows high-speed vulcanization, without using 1,3-di-o-tolylguanidine generating o-toluidine, and has excellent scorch stability. Furthermore, the vulcanization-molded product of the acrylic rubber composition can sufficiently satisfy compression set characteristics required for sealing parts.

10 Claims, No Drawings

US 9,062,188 B2

ACRYLIC RUBBER COMPOSITION

RELATED APPLICATION

This application is a 35 U.S.C. §371 national phase filing of International Patent Application No. PCT/JP2012/053451, filed Feb. 15, 2012, through which and to which priority is claimed under 35 U.S.C. §119 to Japanese Patent Application No. 2011-041101, filed Feb. 28, 2011.

TECHNICAL FIELD

The present invention relates to an acrylic rubber composition. More particularly, the present invention relates to an acrylic rubber composition that has excellent scorch stability and excellent vulcanization characteristics, and that produces a vulcanization-molded product sufficiently satisfying compression set characteristics required for sealing parts.

BACKGROUND ART

Acrylic rubber compositions have excellent balance among heat resistance, oil resistance, and price, and are widely used for sealing parts, such as O rings, gaskets, oil seals, and packings. Examples of acrylic rubber copolymers include those containing an epoxy group, an active chlorine group, an active chlorine group/a carboxyl group, or a carboxyl group as a crosslinking group. Among these, carboxyl group-containing acrylic rubber copolymers have a high vulcanization rate, and excellent heat resistance and excellent compression set characteristics. In addition, they are halogen-free acrylic rubbers that are non-corrosive to metals and are environment-friendly. Therefore, the demand for their use particularly as hose, sealing materials etc., is increasing recently. However, the scorch time (t5) is short relative to the vulcanization rate; that is, as the vulcanization rate increases, the scorch time tends to be too short, whereas as the vulcanization rate decreases, the scorch time tends to become long.

Generally, an aromatic diamine-based compound is used as a vulcanizing agent to secure sufficient scorch time. However, although the use of such a vulcanizing agent ensures scorch stability, the vulcanization reaction itself is slow, and there is thus a problem in productivity.

Patent Document 1 proposes a multivalent amine crosslinkable group-containing acrylic rubber composition using, as a vulcanizing agent, a diurethane compound that is a reaction product of hexamethylenediamine and 9-fluorenyl-methyl chloroformate, and containing 1,8-diazabicyclo[5,4,0]undecene-7 or the like as a basic vulcanization accelerator. However, the vulcanization-molded product obtained from such a composition does not sufficiently satisfy the current compression set characteristics required for sealing parts.

Moreover, each example of Patent Document 1 discloses a molded product having improved compression set characteristics from an acrylic rubber composition, further using 1,3-di-o-tolylguanidine [DOTG] as a vulcanization accelerator. However, DOTG generates o-toluidine, which is a cancer-causing substance, by thermal decomposition. It is therefore concerned that DOTG is toxic to the human body, and the use of DOTG is already abolished in Europe. Accordingly, the use of DOTG may be globally restricted in the future.

PRIOR ART DOCUMENT

Patent Document

Patent Document 1 : WO 2009/096545

OUTLINE OF THE INVENTION

Problem to be Solved by the Invention

An object of the present invention is to provide an acrylic rubber composition that allows high-speed vulcanization without using 1,3-di-o-tolylguanidine generating o-toluidine, has excellent scorch stability, and produces a molded product that can sufficiently satisfy compression set characteristics required for sealing parts.

Means for Solving the Problem

The above object of the present invention can be achieved by an acrylic rubber composition comprising, based on 100 parts by weight of carboxyl group-containing acrylic rubber, 0.05 to 5 parts by weight of a diurethane compound represented by the general formula:

$$R^2(SO_2)_m(CH_2)_nOCONHR^1NHCOO(CH_2)_n(SO_2)_mR^2$$

wherein $R^1$ is a $C_1$-$C_{20}$ linear or branched divalent aliphatic alkylene group, a divalent alicyclic hydrocarbon group, or a divalent aromatic group; $R^2$ is, when it is in a carbamate structure form, a group that decomposes by the action of a basic vulcanization accelerator to generate diamine, and is a $C_1$-$C_{20}$ alkyl group, an alkoxyl group, a phenoxy group, a haloalkyl group, an olefin group, an aryl group or an aralkyl group, a fluorenyl-containing group, an S-containing group, an Si-containing group, an N-containing group, or a P-containing group, the S-containing group or the N-containing group being a heterocyclic aromatic or alicyclic group; n is 0, 1, or 2; and m is 0 or 1; 0.3 to 3 parts by weight of a diaminodiphenyl ether-based compound, and 0.08 to 1.2 parts by weight of an N-containing heterocyclic compound; the composition being free from 1,3-o-tolylguanidine.

Effect of the Invention

The acrylic rubber composition of the present invention has excellent effects of allowing high-speed vulcanization, having excellent scorch stability, and producing a vulcanization-molded product that sufficiently satisfies compression set characteristics required for sealing parts. In addition, the acrylic rubber composition of the present invention does not contain 1,3-di-o-tolylguanidine, which generates o-toluidine. Accordingly, the acrylic rubber composition of the present invention can be suitably used as a vulcanization-molding material for sealing parts, such as gaskets, O rings, or packings.

EMBODIMENTS FOR CARRYING OUT THE INVENTION

Usable examples of carboxyl group-containing acrylic rubbers include copolymers of a carboxyl group-containing unsaturated compound and at least one of an alkyl acrylate including an alkyl group having 1 to 8 carbon atoms and an alkoxyalkyl acrylate including an alkoxyalkyl group having 2 to 8 carbon atoms. Preferably, aliphatic diamine vulcanization-type carboxyl group-containing acrylic rubbers are used.

Usable alkyl acrylates are, for example, methyl acrylate, ethyl acrylate, propyl acrylate, isopropyl acrylate, n-butyl acrylate, n-hexyl acrylate, 2-ethylhexyl acrylate, n-octyl acrylate, and their corresponding methacrylates. In general, alkyl groups having a longer chain are advantageous in terms of cold resistance, but are disadvantageous in oil resistance. Alkyl groups having a shorter chain have an opposite tendency. In terms of the balance between oil resistance and cold resistance, ethyl acrylate and n-butyl acrylate are preferably used.

Moreover, usable alkoxyalkyl acrylates are, for example, methoxymethyl acrylate, methoxyethyl acrylate, ethoxyethyl acrylate, n-butoxyethyl acrylate, ethoxy propylacrylate, etc., preferably 2-methoxyethyl acrylate and 2-ethoxyethyl acrylate. Although the alkoxyalkyl acrylate and the alkyl acrylate can be singly used, it is preferable to use the former at a ratio of 60 to 0 wt %, and the latter at 40 to 100 wt %. When the alkoxyalkyl acrylate is copolymerized, excellent balance between oil resistance and cold resistance can be achieved. However, when the alkoxyalkyl acrylate is copolymerized at a ratio higher than the above range, normal state physical properties and heat resistance tend to decrease.

Examples of carboxyl group-containing unsaturated compounds include methyl, ethyl, propyl, isopropyl, n-butyl, isobutyl, and other monoalkyl esters of unsaturated dicarboxylic acids, such as maleic acid, fumaric acid, itaconic acid, and citraconic acid. Preferably, maleic acid mono-n-butyl ester, fumaric acid monoethyl ester, and fumaric acid mono-n-butyl ester are used. Other than these compounds, unsaturated monocarboxylic acids, such as acrylic acid and methacrylic acid, can also be used. Such a carboxyl group-containing unsaturated compound is used at a copolymerization ratio of about 0.5 to 10 wt. %, preferably about 1 to 7 wt. %, in the carboxyl group-containing acrylic elastomer. When the copolymerization ratio is lower than the above range, vulcanization is insufficient, deteriorating compression set values. In contrast, when the copolymerization ratio is greater than the above range, scorching is more likely to occur. Incidentally, since the copolymerization reaction is performed in such a manner that the polymerization conversion rate is 90% or more, the weight ratio of each charged monomer is approximately the copolymer component weight ratio of the resulting copolymer.

In the carboxyl group-containing acrylic elastomer, other copolymerizable ethylenic unsaturated monomers, such as styrene, a-methylstyrene, vinyltoluene, vinylnaphthalene, (meth)acrylonitrile, acrylic acid amide, vinyl acetate, cyclohexyl acrylate, benzyl acrylate, 2-hydroxyethyl acrylate, 4-hydroxybutyl acrylate, ethylene, propylene, piperylene, butadiene, isoprene, and pentadiene, can be further copolymerized at a ratio of about 50 wt. % or less.

In addition, if necessary, in order to improve kneading processability, extrusion processability, and other properties, a polyfunctional (meth)acrylate or oligomer having a glycol residue in the side chain can be further copolymerized. Examples thereof include di(meth)acrylates of alkylene glycols, such as ethylene glycol, propylene glycol, 1,4-butandiol, 1,6-hexanediol, and 1,9-nonanediol; di(meth)acrylates of neopentylglycol, tetraethyleneglycol, tripropyleneglycol, and polypropyleneglycol; bisphenol A ethylene oxide adduct diacrylate, dimethylol tricyclodecane diacrylate, glycerine methacrylate acrylate, 3-acryloyloxy glycerine monomethacrylate, and the like.

Examples of such a carboxyl group-containing acrylic rubber used in the present invention include commercial products, i.e. aliphatic diamine vulcanization-type ACM polymers such as AR14 and AR12 (produced by Zeon Corporation), Noxtite PA-522 and PA-522HF (produced by Unimatec Co., Ltd.), and aliphatic diamine vulcanization-type AEM polymers such as Vamac G and Vamac GLS (produced by DuPont Dow Elastomers), which can be used as they are.

Usable diurethane compounds are diurethane compounds represented by the general formula:

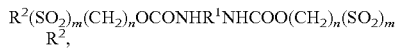

preferably diurethane compounds in which the amino group of alkylenediamine represented by the general formula:

is di-substituted with 9-fluorenylmethyl chloroformate [Fmoc], more preferably diurethane compounds in which the amino group of hexamethylenediamine (l=6) is di-substituted with [Fmoc] [HMDA-Fmoc]:

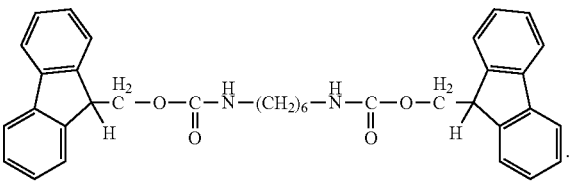

The diurethane compound is used in an amount of 0.05 to 5 parts by weight, preferably 0.1 to 4 parts by weight, based on 100 parts by weight of acrylic rubber. When the diurethane compound is not used, the vulcanization rate decreases. In contrast, when the diurethane compound is used in an amount greater than the above range, the dispersibility of the composition is reduced.

Such a diurethane compound is synthesized by the following reaction (1) or (2) (see Patent Document 1).

(1) $H_2NR^1NH_2 + 2ClCOO(CH_2)_n(SO_2)_mR^2$ (chloroformate compound)

(2) $OCNR^1NCO + 2R^2(SO_2)_m(CH_2)_nOH$ (hydroxyl group-containing compound)

n: 0, 1 or 2
m: 0 or 1

Here, $R^1$ is a $C_1$-$C_{20}$ linear or branched divalent aliphatic alkylene group, a divalent alicyclic hydrocarbon group, or a divalent aromatic group. Examples of divalent aliphatic alkylene groups include —$(CH_2)_l$— (l=2 to 20), —$CH_2C(CH_3)_2CH_2$—, and the like. Examples of divalent alicyclic hydrocarbon groups include the following:

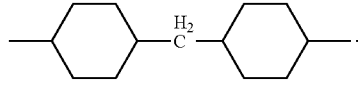

Examples of divalent aromatic groups include the following:

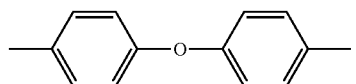

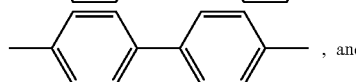

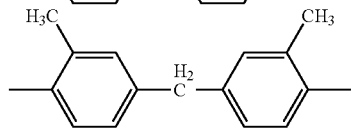

Preferably, $C_4$-$C_{10}$ linear alkylene groups are used.

Moreover, $R^2$ is, when it is in a carbamate structure form, a group that decomposes by the action of a basic vulcanization accelerator to generate diamine. Specifically, $R^2$ is a $C_1$-$C_{20}$ alkyl group, an alkoxyl group, a phenoxy group, a haloalkyl group, an olefin group, an aryl group, an aralkyl group, a fluorenyl-containing group, an S-containing group, an Si-containing group, an N-containing group, or a P-containing group. The S-containing group or N-containing group may be an aromatic or alicyclic heterocyclic group.

Specific examples of $R^2$ include linear or alicyclic alkyl groups, such as methyl, ethyl, propyl, isopropyl, diisopropylmethyl, tert-butyl, tert-amyl, cyclobutyl, cyclohexyl, cycloheptyl, and cyclopropylmethyl groups; alkoxyl or phenoxy groups, such as methoxy, ethoxy, propoxy, butoxy, phenoxy, and 4-methylphenoxy; haloalkyl groups, such as 2,2,2-trichloroethyl, 1,1-dimethyl-2-bromoethyl, 1,1-dimethyl-2, 2-dibromoethyl, and 1,1-dimethyl-2,2,2-trichloroethyl groups; olefin groups, such as vinyl, allyl, 1-isopropylallyl, cinnamyl, and 4-nitrocinnamyl groups; aryl or aralkyl groups, such as phenyl, m-nitrophenyl, o-nitrophenyl, 3,4-dimethoxy-6-nitrobenzyl, phenyl(o-nitrophenyl)methyl, benzyl, p-methoxybenzyl, 3,5-dimethoxybenzyl, p-decyloxybenzyl, p-nitrobenzyl, p-bromobenzyl, p-chlorobenzyl, p-cyanobenzyl, 2,4-dichlorobenzyl, m-chloro-p-ethoxybenzyl, 4-methylsulfonylbenzyl, 2-phenylethyl, diphenylethyl, 1-methyl-1-(4-biphenyl)ethyl, 1-(3,5-di-tert-buthylphenyl)-1-methylethyl, and 9-anthrenylmethyl groups; fluorenyl-containing groups, such as 9-fluorenylmethyl, 9-(2-sulfo) fluorenylmethyl, and 9-(2,7-dibromo)fluorenylmethyl groups; sulfonyl-containing groups, such as 2-methylsulfonylethyl and 2-(p-toluenesulfonyl)ethyl groups; S-containing groups, such as 2-methylthioethyl, 4-methylthiophenyl, 2,4-dimethylthiophenyl, 2-(1,3-dithianyl)methyl, methyldithio, ethyldithio, isopropyldithio, tert-butyldithio, phenyldithio, and 2,7-di-tert-butyl-[9-(10,10-dioxo-10,10,10,10-tetrahydrothianyl]methyl groups; Si-containing groups, such as 2-trimethylsilylethyl groups; N-containing groups, such as 1,1-dimethyl-2-cyanoethyl, 2-(2'-pyridyl)ethyl, 2-(4'-pyridyl)ethyl, dimethyl-2-cyanoethyl, 5-benzoyloxazole, and 2-(N,N-dicyclohexyl carboxamide)ethyl groups; and P-containing groups, such as 2-phosphonioethyl, 2-triphenylphosphonioisopropyl, and 2-(triphenylphosphonio)ethyl groups. Preferable among these are 9-fluorenylmethyl, 9-(2-sulfo) fluorenylmethyl, 9-(2,7-dibromo)fluorenylmethyl, 2-(p-toluenesulfonyl)ethyl, and 2-(1,3-dithianyl)methyl groups; and more preferable are 9-fluorenylmethyl, 2-(p-toluenesulfonyl)ethyl, and 2-(1,3-dithianyl)methyl groups.

According to the above production method (1) for producing a diurethane compound, a mixture of a diamine compound (e.g., hexamethylenediamine) dissolved in advance in a hot water bath, a 1,4-dioxane solvent, and an aqueous solution of sodium carbonate as a neutralizer is cooled to about 0 to 2° C. A 1,4-dioxane solution of a chloroformate compound is added dropwise thereto in a molar amount stoichiometrically twice or more the amount of the diamine compound at a dropping rate such that the temperature in the reactor does not exceed 5° C. After the completion of dropping, the resulting mixture is stirred at room temperature for about several hours, and water is then added to the reaction mixture. The precipitated solid is collected by filtration.

According to the above method (2) for producing a diurethane compound, a hydroxyl group-containing compound and a diisocyanate compound are reacted in an organic solvent, such as toluene or dioxane, while stirring at about 75 to 110° C., followed by cooling. The insoluble residue is collected by filtration.

Examples of diaminodiphenyl ether-based compounds include 2,2-bis[4-(4-aminophenoxy)phenyl]propane, 4,4'-diaminodiphenyl ether, and the like. Preferably, 2,2-bis[4-(4-aminophenoxy)phenyl]propane is used in an amount of 0.3 to 3 parts by weight, preferably 0.5 to 2 parts by weight, based on 100 parts by weight of acrylic rubber. When the diaminodiphenyl ether-based compound is used in an amount less than this range, the compression set value increases. In contrast, when the diaminodiphenyl ether-based compound is used in an amount greater than this range, the vulcanization rate decreases.

Examples of N-containing heterocyclic compounds include 1,8-diazabicyclo[5,4,0]undecene-7, 1,5-diazabicyclo[4,3,0]nonene-5, and salts thereof. The N-containing heterocyclic compound is used in an amount of 0.08 to 1.2 parts by weight, preferably 0.15 to 0.8 parts by weight, based on 100 parts by weight of acrylic rubber. When the N-containing heterocyclic compound is used in an amount less than this range, the vulcanization rate decreases. In contrast, when the N-containing heterocyclic compound is used in an amount greater than this range, the scorch time increases.

In the present invention, the diurethane compound and the diaminodiphenyl ether-based compound are compounded as vulcanizing agents, and the N-containing heterocyclic compound is compounded as a vulcanization accelerator. However, as long as these compounds are used in the amounts specified above, other compounds can also be used as vulcanizing agents and vulcanization accelerators in combinations with the above compounds.

The acrylic rubber composition comprising the aforementioned essential components further contains carbon black as a filler. Examples of carbon black include FEF carbon black, GPF carbon black, SRF carbon black, FT carbon black, and like soft carbon black, such as Seast G-SO (a commercial product of Tokai Carbon Co., Ltd.). The carbon black is used in an amount of about 80 parts by weight or less, preferably about 50 to 60 parts by weight, based on 100 parts by weight of acrylic rubber.

Other than carbon black, the acrylic rubber composition suitably contains silica and like inorganic fillers, stearic acid and like processing aids, zinc oxide, magnesium oxide, hydrotalcite and like acid acceptors, antioxidants, plasticizers, and other necessary compounding agents that are generally used as compounding agents of carboxyl group-containing acrylic rubbers.

The preparation of the acrylic rubber composition is carried out as follows. First, the components other than the vulcanizing agents and the vulcanization accelerator are kneaded using a kneading machine, such as a single-screw extruder, a twin-screw extruder, a roll, a Banbury mixer, a kneader, or a high-shear mixer. Then, the vulcanizing agent and the vulcanization accelerator are added, and kneaded by an open roll. The prepared acrylic rubber composition is generally vulcanized by press vulcanization at about 150 to 230° C. for about 0.5 to 30 minutes, optionally followed by oven vulcanization (secondary vulcanization) at about 150 to 250° C. for about 0.5 to 24 hours.

EXAMPLES

The following describes the present invention with reference to Examples.

Example 1

| | |
|---|---|
| Carboxyl group-containing acrylic rubber (NOXTITE PA522, produced by Unimatec Co., Ltd.) | 100 parts by weight |
| FEF carbon black (Seast G-SO) | 55 parts by weight |
| Stearic acid | 2 parts by weight |
| Antioxidant [4,4'-($\alpha$,$\alpha$-dimethylbenzyl)diphenylamine] | 2 parts by weight |
| 1,8-diazabicyclo[5,4,0]undecene-7 | 0.5 parts by weight |
| 2,2-bis[4-(4-aminophenoxy)phenyl]propane | 2 parts by weight |
| 1,6-bis[(9-fluorenylmethyl)carbamate]hexane [HMDA-Fmoc] | 2 parts by weight |

Among the above components, those other than the vulcanizing agent and the vulcanization accelerator were kneaded by a kneader. Thereafter, the vulcanizing agent and the vulcanization accelerator were added thereto in an open roll. The thus-prepared acrylic rubber composition was vulcanized by press vulcanization at 180° C. for 10 minutes and oven vulcanization at 150° C. for 24 hours, thereby obtaining an O ring specified in JIS B2401 G25 corresponding to ISO 3601-1.

Moreover, the vulcanization characteristics of the compound which is the acrylic rubber composition and vulcanizate physical properties were measured in the following manner.

Vulcanization test: according to JIS K6300-2 corresponding to ISO 6502.
  The highest torque ($M_H$) was calculated from the vulcanization curve at 210° C., and T90 was calculated from the torque at 210° C. after 6 minutes.
  As the highest torque ($M_H$) was higher and the T90 was shorter, the vulcanization rate was faster.
Scorch stability: according to JIS K6300 corresponding to ISO 289-1 and ISO 289-2. Scorch time t5 (minute) was calculated from the Mooney curve at 125° C.
  As the value of t5 was greater (the scorch time was longer), compound scorch was less likely to occur, reducing defects caused by compound scorch.
Compression set: according to JIS K6262 corresponding to ISO 815 (175° C., 72 hours).
  As the compression set value was smaller, the sealing properties of the O ring were better, and the seal life was longer.

Example 2

In Example 1, the amount of 1,8-diazabicyclo[5,4,0]undecene-7 was changed to 0.1 parts by weight.

Example 3

In Example 1, the amount of 1,8-diazabicyclo[5,4,0]undecene-7 was changed to 1.0 part by weight.

Example 4

In Example 1, the amount of 2,2-bis[4-(4-aminophenoxy)phenyl]propane was changed to 0.5 parts by weight.

Example 5

In Example 1, the amount of 2,2-bis[4-(4-aminophenoxy)phenyl]propane was changed to 2.5 parts by weight.

Example 6

In Example 1, the amount of 1,6-bis[(9-fluorenylmethyl)carbamate]hexane [HMDA-Fmoc] was changed to 0.1 parts by weight.

Example 7

In Example 1, the amount of 1,6-bis[[(9-fluorenylmethyl)oxy]carbonyl]hexane [HMDA-Fmoc] was changed to 4.0 parts by weight.

Comparative Example 1

In Example 1, the amount of 1,8-diazabicyclo[5,4,0]undecene-7 was changed to 0.05 parts by weight.

Comparative Example 2

In Example 1, the amount of 1,8-diazabicyclo[5,4,0]undecene-7 was changed to 1.5 parts by weight.

Comparative Example 3

In Example 1, the amount of 2,2-bis[4-(4-aminophenoxy)phenyl]propane was changed to 0.1 parts by weight.

Comparative Example 4

In Example 1, the amount of 2,2-bis[4-(4-aminophenoxy)phenyl]propane was changed to 5.0 parts by weight.

Comparative Example 5

In Example 1, 1,6-bis[(9-fluorenylmethyl)carbamate]hexane [HMDA-Fmoc] was not used.

Comparative Example 6

In Example 1, the amount of 1,6-bis[(9-fluorenylmethyl)carbamate]hexane [HMDA-Fmoc] was changed to 10 parts by weight.

The following table shows the results of the above Examples and Comparative Examples. Comparative Example 6 showed a poor dispersion state, and each of the above items could not be measured.

TABLE

| Measurement item | | Example | | | | | | | Comparative Example | | | | |
|---|---|---|---|---|---|---|---|---|---|---|---|---|---|
| | | 1 | 2 | 3 | 4 | 5 | 6 | 7 | 1 | 2 | 3 | 4 | 5 |
| [Vulcanization test] | | | | | | | | | | | | | |
| $M_H$ | (dN·m) | 8.5 | 7.7 | 8.9 | 7.7 | 8.6 | 7.7 | 12 | 4 | 10 | 6.3 | 10 | 7 |
| T90 | (sec) | 252 | 300 | 221 | 220 | 253 | 265 | 200 | 500 | 200 | 182 | 400 | 400 |
| [Scorch test] | | | | | | | | | | | | | |
| t5 | (min) | 21.5 | 43.5 | 11.5 | 45.0 | 30.2 | 10.2 | 30.0 | >60 | 5.0 | >60 | 20.0 | 30.0 |
| [Compression set] | | | | | | | | | | | | | |
| 175° C., 72 hr | (%) | 45 | 41 | 40 | 50 | 40 | 42 | 50 | 60 | 44 | 66 | 37 | 41 |

The above results demonstrate the followings:

(1) Vulcanization-molded products of acrylic rubber compositions of the compounding formulations used in the Examples have various characteristics required for sealing parts.

(2) When the amount of N-containing heterocyclic compound used is less, the vulcanization torque is lower (Comparative Example 1). On the contrary, when the amount of N-containing heterocyclic compound is overly larger, the vulcanization torque increases, but the scorch time decreases (Comparative Example 2).

(3) When the amount of aromatic polyamine compound used is less, the compression set characteristics are deteriorated, and the vulcanization torque decreases (Comparative Example 3). On the contrary, when the amount of aromatic polyamine compound is overly large, the vulcanization time increases (Comparative Example 4).

(4) When a diurethane-substituted compound is not used, the vulcanization time increases (Comparative Example 5); whereas when a diurethane-substituted compound is used in an excess amount, the dispersibility is deteriorated.

The invention claimed is:

1. An acrylic rubber composition, based on 100 parts by weight of carboxyl group-containing acrylic rubber:

0.05 to 5 parts by weight of a diurethane compound represented by the general formula:

$$R^2(SO_2)_m(CH_2)_nOCONHR^1NHCOO(CH_2)n(SO_2)_mR^2$$

wherein $R^1$ is a $C_1$-$C_{20}$ linear or branched divalent aliphatic alkylene group, a divalent alicyclic hydrocarbon group, or a divalent aromatic group; $R^2$ is, when it is in a carbamate structure form, a group that decomposes by the action of a basic vulcanization accelerator to generate diamine, and is a $C_1$-$C_{20}$ alkyl group, an alkoxyl group, a phenoxy group, a haloalkyl group, an olefin group, an aryl group, an aralkyl group, a fluorenyl-containing group, an S-containing group, an Si-containing group, an N-containing group, or a P-containing group, the S-containing group or the N-containing group being a heterocyclic aromatic or alicyclic group; n is 0, 1, or 2; and m is 0 or 1;

0.3 to 3 parts by weight of a diaminodiphenyl ether-based compound; and 0.08 to 1.2 parts by weight of an N-containing heterocyclic compound;

the composition being free from 1,3-di-o-tolylguanidine.

2. The acrylic rubber composition according to claim 1, wherein the carboxyl group-containing acrylic rubber is an aliphatic diamine vulcanizable carboxyl group-containing acrylic rubber.

3. The acrylic rubber composition according to claim 1, wherein the diurethane compound is represented by the following general formula:

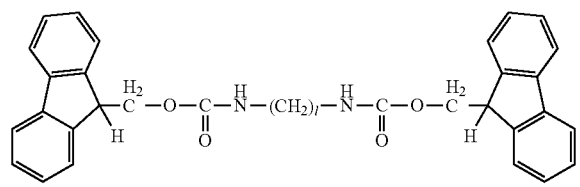

wherein l is 4, 5, or 6.

4. The acrylic rubber composition according to claim 3, wherein the diurethane compound is represented by the following general formula:

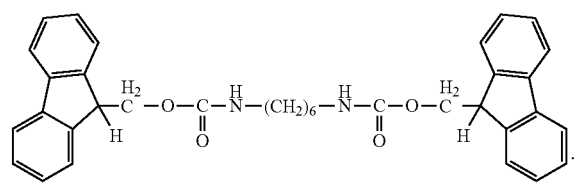

5. The acrylic rubber composition according to claim 1, wherein the diaminodiphenyl ether-based compound is 2,2-bis[4-(4-aminophenoxy)phenyl]propane.

6. The acrylic rubber composition according to claim 1, wherein the N-containing compound is 1,8-diazabicyclo[5,4,0]undecene-7, 1,5-diazabicyclo[4,3,0]nonene-5, or a salt thereof.

7. A vulcanization-molded product obtained by vulcanization-molding of the acrylic rubber composition according to claim 1.

8. The vulcanization-molded product according to claim 7, which is used as a sealing part.

9. A vulcanization-molded product obtained by vulcanization-molding of the acrylic rubber composition according to claim 3.

10. The vulcanization-molded product according to claim 9, which is used as a sealing part.

* * * * *